March 25, 1952 — J. P. HAGEN ET AL — 2,590,098

THYRATRON MODULATOR

Filed July 3, 1943 — 3 Sheets-Sheet 1

Inventors
JOHN P. HAGEN
ALDEN H. RYAN

By [signature]
Attorney

March 25, 1952 J. P. HAGEN ET AL 2,590,098
THYRATRON MODULATOR
Filed July 3, 1943 3 Sheets-Sheet 2

Inventors
JOHN P. HAGEN
ALDEN H. RYAN

By Stone & Bush
Attorney

March 25, 1952 J. P. HAGEN ET AL 2,590,098

THYRATRON MODULATOR

Filed July 3, 1943 3 Sheets-Sheet 3

Inventor

JOHN P. HAGEN

ALDEN H. RYAN

By Stone E. Bush

Attorney

Patented Mar. 25, 1952

2,590,098

UNITED STATES PATENT OFFICE 2,590,098

THYRATRON MODULATOR

John P. Hagen, Arlington, and Alden H. Ryan, Alexandria, Va.

Application July 3, 1943, Serial No. 493,354

10 Claims. (Cl. 171—97)

Figure 1:
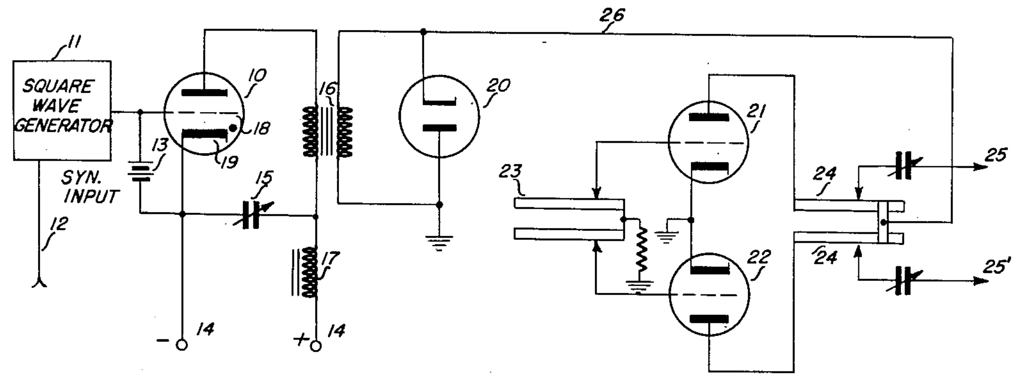

(Granted under the act of March 3, 1883, as amended April 30, 1928; 370 O. G. 757)

This invention relates to a means for producing high powered variable time length voltage pulses and more particularly to a means applicable for keying a pulse oscillator of the radio echo type, for instance.

The prior art has proposed many methods of and means for producing high voltage impulses, none of which have proven very satisfactory from the standpoint that they generally employ a dangerously high voltage supply in order to obtain a correspondingly high voltage impulse. The present invention, however, relates to a reliable, efficient means of producing high voltage impulses which can be readily used for a plate keying a pulse oscillator and includes, a transformer, a low impedance switch connected in series with the primary thereof, and a low voltage high current supply connected across said switch and primary winding of the transformer. This circuit, as will be pointed out more fully hereinafter, is capable of producing power pulses of 500,000 to 15,000,000 watts, depending upon the voltage supply, at variable pulse lengths, ranging from .25 microsecond to 15 microseconds in duration. Thus it becomes obvious that the use of the present invention is not to be limited to a plate keying means for a pulse oscillator as it can be readily adapted to X-ray apparatus or other apparatus responsive in operation to high powered impulses.

It is an object of this invention to provide a novel means for producing high powered impulses.

It is another object of this invention to provide a novel means for producing high powered variable time length impulses.

It is another object of this invention to provide a novel means incorporating a transformer and a simple charging capacitance for producing high powered variable time length impulses.

It is another object of this invention to provide a novel means incorporating a transformer, a resonant circuit and any suitable low impedance switch for producing high powered variable time length impulses.

Other objects and features of the present invention will become apparent upon a careful consideration of the following detailed description when taken together with the accompanying drawings the figures of which are designed for the express purpose of illustration and not as a definition of the limits of the invention. Reference for the latter purpose is to be had to the appended claims.

Figure 2:
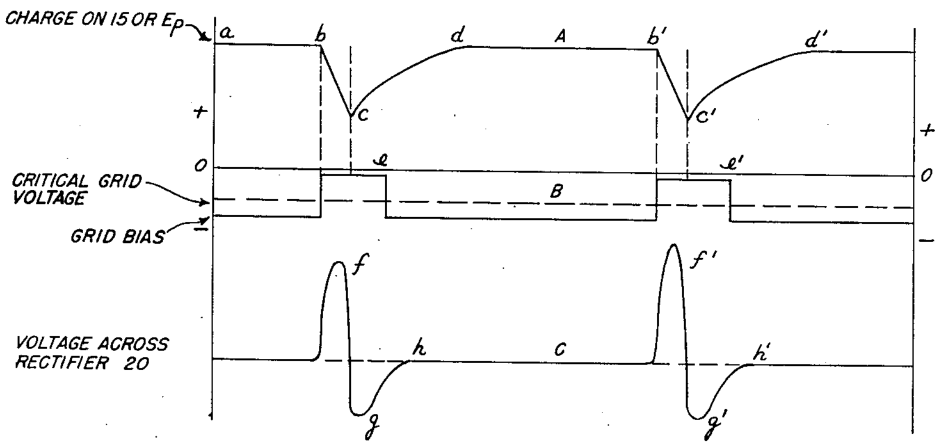
Figure 3:
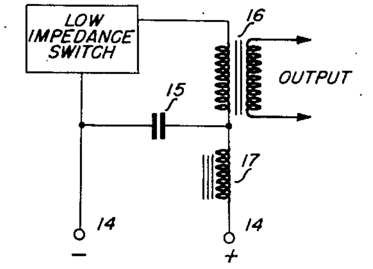
Figure 4:
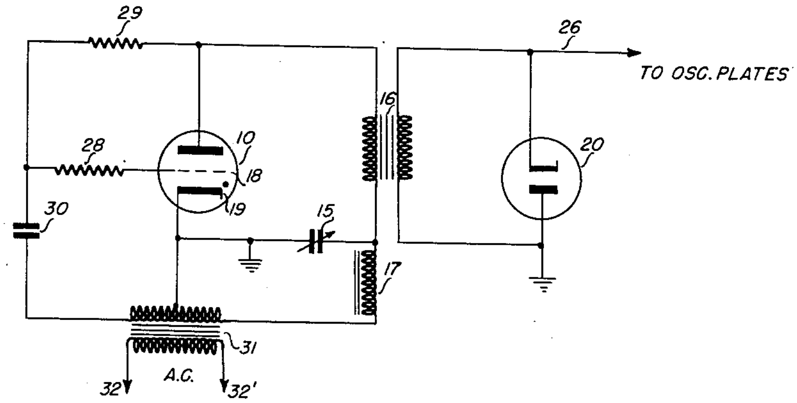
Figure 5:
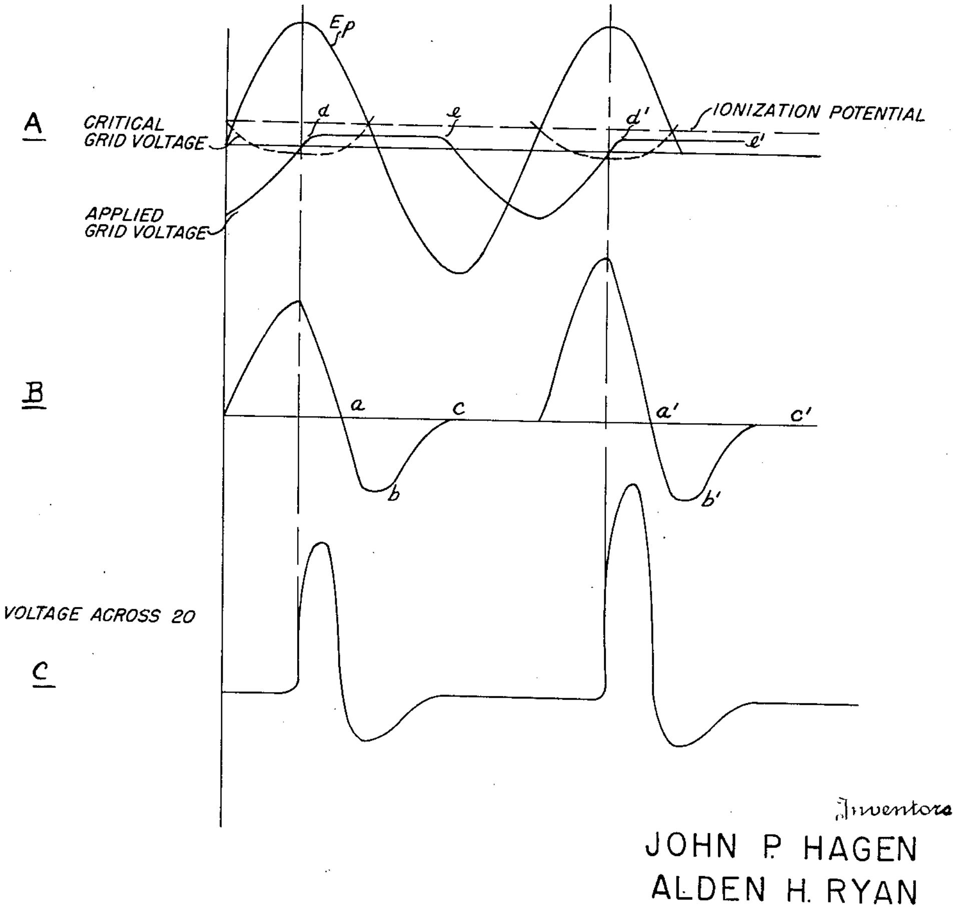
Figure 6:
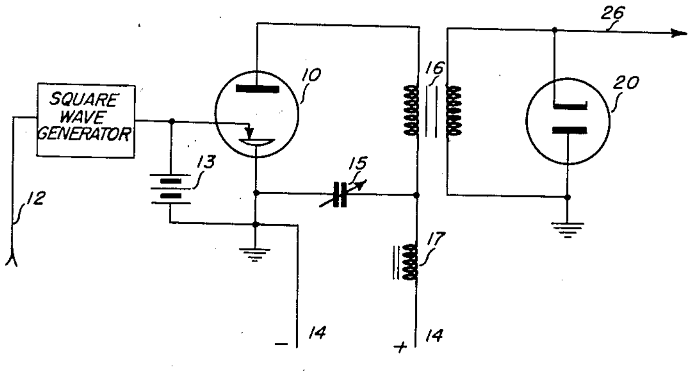
Figure 7:
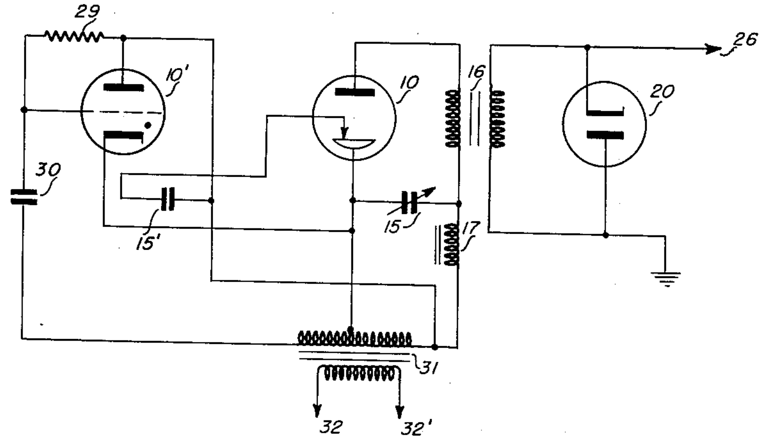

Turning to the drawings wherein similar reference characters refer to similar circuit elements throughout:

Figure 1 is a schematic diagram of one embodiment of the present invention,

Figure 2 is a series of wave forms drawn to represent voltage variations at different points along the circuit of Figure 1 during a normal operating cycle, Figure 3 is a schematic diagram partly in block of another embodiment of the present invention, Figure 4 is a schematic diagram of still another embodiment of the present invention, Figure 5 is a series of wave forms drawn to represent voltage variations occurring at different points along the circuit of Figure 4 during a normal operating cycle, Figure 6 is a schematic diagram of still another embodiment of the present invention and Figure 7 is a schematic diagram of still another embodiment of the present invention.

It is contemplated by the present invention to provide a novel means for abruptly initiating and interrupting a high value of current through the primary winding of a transformer to produce a high voltage impulse across the secondary winding thereof. More particularly it is contemplated to provide a gaseous discharge tube or any other suitable low impedance electronic or mechanical switch together with a resonant circuit for abruptly starting and interrupting a large surge of current through the primary winding of a suitable transformer.

Reference is had more particularly to Fig. 1 wherein there is shown one embodiment of the present invention comprising a gaseous discharge device 10 of the thyratron variety, a square wave generator 11, a transformer 16 and a diode rectifier 20 connected in shunt with the secondary thereof. The diode 20 is merely a means of eliminating a negative inductive swing of the secondary caused by an abrupt cessation of primary current as will be pointed out hereinafter. This diode can be deleted by properly designing transformer 16. A source of negative biasing potential 13 is tied across the grid cathode circuit of tube 10 to maintain this switch open or in a nonconducting state until keyed by the square wave generator 11 which may be synchronized by any suitable timing wave tied to lead 12. As will be pointed out hereinafter, the repetition rate of the output pulse from transformer 16 is controlled by the square wave generator 11 while the pulse duration or period is regulated in accordance with the size of condenser 15 and the resistance and inductance of the primary winding of transformer 16. As indicated in the drawing, a direct source of low voltage high current is tied across leads 14 and 14', while a charging condenser 15 is tied in shunt therewith. Thus during the nonconducting state of tube 10, condenser 15 is charged through the serially connected inductance 17 and is subsequently discharged through the primary winding of transformer 16 as tube 10 is rendered conducting. The output of transformer 16 is taken from lead 26 and fed to the utilization network, for example, the plates of a pair of line controlled oscillators 21 and 22. Although we have shown a line controlled oscillator as comprising the load it must be understood that if the present invention is to be used as a plate keying means for a pulse oscillator, any type of oscillator can be used without departing from the spirit of the invention.

The operation of the circuit shown in Figure 1 is as follows: The gas discharge tube 10 is normally held nonconducting by the negative potential or source 13 until condenser 15 is fully charged thereby placing the full charge across tube 10 as shown from *a* to *b* in curve A of Figure 2. As known by those skilled in the art, in gas tube operation a critical grid voltage is produced for each distinct potential placed across the tube, and requires that the grid be maintained below this potential in order to prevent the tube from firing. This critical voltage varies in accordance with the potential across the tube and is represented as the dotted line shown in curve B of Figure 2. Thus as the output from the square wave generator 11 drives grid 18 above the critical grid voltage as indicated at *e* and *e'* in curve B of Figure 2, tube 10 is fired and consequently the grid looses control as condenser 15 initiates a rapid discharge from points *b* to *c* of curve A through the primary winding of transformer 16 in accordance with an R. L. C. circuit of this type. The high current discharge of condenser 15 produces a high voltage impulse across the secondary of transformer as shown in curve C of Figure 2, the period of which is, in part, a function of the size of condenser 15. Consequently the size of condenser 15 can be regulated to produce a wide range of time length output pulses. It follows that the inductance 17 must be sufficiently large to prevent condenser 15 from recharging as shown by points *c* to *d* of curve A to fire tube 10 again until the input pulse has terminated. In order to produce maximum power output, condenser 15 and inductance 17 can be selected so as to resonate at the recurrence frequency of the output of square wave generator 11 thereby developing maximum charging voltage across condenser 15. Subsequent to the termination of the discharge of condenser 15 there is an abrupt cessation of primary current which would normally produce a strong inductive kick when an ordinary transformer is used, thereby driving the output pulse sharply negative on the terminating edge as shown by points *f* to *g* and *f'* to *g'* of curve C, of Figure 2. This voltage appears across the diode rectifier which shorts the negative portion *g* to *h* and *g'* to *h'* to ground thereby allowing but a single impulse to be applied to the plates of the oscillators 21 and 22.

Thus from the foregoing description it becomes obvious that any suitable low impedance switch of either mechanical or electronic operation can be substituted for the gas discharge tube 10 as shown more clearly by Figure 3. The operation of this circuit is substantially the same as the circuit shown in Fig. 1.

Turning now to Fig. 4 there is shown an alternating voltage operated pulse modulator comprising an input transformer 31, a phase shifting network comprising resistance 29 and capacitance 30, and a gas discharge tube or switch 10 also of the thyratron variety. A source of suitable alternating voltage of any convenient frequency, such as, for example, 60 cycles is tied to the input leads 32 and 32' of the transformer 31, the secondary of which is preferably of the split-phase or center tap type closed by the phase shifting network comprising resistance 29 and capacitance 30 and also by the glow tube 10. The phase shifting network is generally adjusted so that the applied grid voltage will cut or exceed the critical grid voltage level at the point of maximum plate potential as shown in curve A of Figure 5.

The operation of the present embodiment can be more readily comprehended upon a careful consideration of the ensuing discussion. As previously mentioned the phase shift between the impressed grid and plate potential of tube 10 is such that tube 10 fires at the point where condenser 15 has obtained maximum charge as shown by curve B of Figure 5. Thus as tube 10 fires, condenser 15 initiates a rapid discharge of high current through the primary winding of transformer 16 also shown in curve B of Figure 5. A negative overshoot is again produced by the inductive kick of the primary winding at the termination of the discharge of condenser 15 as shown in curve B as extending from points *a* to *b* to *c* thereby holding the plate of the tube 10 negative with respect to the cathode to prevent double firing of tube 10. As shown in curve A of Fig. 5 the impressed grid voltage starts out as a sinusoidal voltage until tube 10 fires at which point there exists a very low impedance between the grid 18 and the cathode 19 to cause the grid voltage, due to poor voltage regulation at the source, to level out over the portion *d* to *e*. In order to increase the power output of this embodiment to a maximum, condenser 15 and inductance 17 are again selected to resonate at the applied frequency at the input terminals 32 and 32'. Consequently after resonance has been established subsequent charging of condenser 15 will be a maximum as indicated by the second charging cycle illustrated in curve B of Figure 5.

The rapid high current discharge of condenser 15 through the primary winding of transformer produces a high voltage output pulse as shown in curve C of Figure 5 the period of which is again determined by the R. L. C. constants of a circuit of this type. Thus the time length of the output pulse can be regulated over a wide range of values by varying the size of condenser 15. However, in order to maintain resonance inductance 17 must be varied accordingly.

Turning in detail to Figure 6 there is shown another embodiment of the present invention incorporating a direct current controlled gas-discharge tube of the ignitron variety capable of delivering pulses of much higher power than the thyratron circuit shown in Figures 1 and 4. The operation and elements of this circuit are identical to that of Figure 1 with the exception that the square wave generator in this embodiment is preferably of the gas discharge type in order to provide sufficient igniter current to fire the ignitron. Therefore, further explanation of this circuit is believed to be unnecessary.

Still another embodiment of this invention is shown in Figure 7 wherein there is disclosed an alternating voltage operated ignitron pulse modulator which is fired by the thyratron 10'. The phase shift between the impressed grid voltage and the plate voltage of the thyratron is again regulated by the phase shifting network so as to discharge condenser 15' at the point of maximum plate potential on thyratron and consequently on the ignitron 10 since the plate voltage of both tubes are in phase, thereby providing the ignitron with sufficient igniter current to simultaneously fire the igniter and thereby discharge condenser 15 through the primary winding of transformer 16.

It must be understood that we are fully aware of many modifications which can be made in the present invention, such as, for instance, an alternate method of obtaining the phase shift between the grid and plate potentials for firing the glow discharge tube at the peak plate potential. Therefore this invention is not to be restricted except insofar as is necessitated by the prior art and the spirit of the appended claims.

The invention described herein may be manufactured and used by or for the Government of the United States of America for governmental purposes without the payment of any royalties thereon or therefor.

We claim:

1. A means for producing a series of high powered impulses, comprising a low impedance switch, a transformer having the primary winding thereof connected in series with said switch, a source of steady potential connected across the series connection of said switch and said primary winding, a condenser connected in shunt with said potential, an inductance connected in series with said source of potential and through which said condenser is charged, and a means operating said switch at a rate that corresponds to the resonant frequency of said inductance and said condenser thereby discharging said condenser through said primary winding to produce a high voltage impulse across the secondary of said transformer.

2. A means for producing a series of high powered impulses comprising a gaseous-discharge tube, a transformer having the primary winding thereof connected in series with said tube, a source of steady potential connected across the series connection of said tube and said primary winding, a condenser connected in shunt with said potential, an inductance connected in series with said source of potential and through which said condenser is charged, and a means for keying said tube at a rate that corresponds to the resonant frequency of said inductance and said condenser thereby discharging said condenser through said primary winding to produce a high voltage impulse across the secondary of said transformer.

3. A means for producing a series of high powered impulses, comprising a low impedance switch, a transformer having the primary winding thereof connected in series with said switch, a source of alternating voltage connected across said switch and serially connected primary winding, a condenser connected in shunt with said source of alternating voltage, means for closing said switch at the peak voltage point thereby discharging said condenser through said primary winding and switch to produce a high voltage impulse across the secondary of said transformer.

4. A means for producing a series of high powered impulses, comprising a gaseous discharge tube having a control electrode therefor, a transformer having the primary winding thereof connected in series with said tube, a source of alternating voltage connected across said tube and serially connected primary winding, phase shift means connecting the control electrode of said tube to said source of alternating voltage, said phase shift means being operative to render said tube conducting at the peak voltage point of said alternating voltage source, whereby a high voltage impulse is produced across the secondary of said transformer.

5. A means for producing a series of high powered impulses, comprising a low impedance switch, a transformer having the primary thereof connected in series with said switch, a source of alternating potential connected across said switch and serially connected primary winding, a condenser connected in shunt with said source of alternating voltage, an inductance connected in series with said source of voltage and through which said condenser is charged, said alternating voltage having a frequency which corresponds to the resonant frequency of said inductance and said condenser, and means for closing said switch at the peak voltage point of said alternating voltage thereby rapidly discharging said condenser through said primary winding to produce a high voltage impulse across the secondary of said transformer.

6. A means for producing a series of high powered impulses, comprising a gaseous-discharge tube, a transformer having the primary winding thereof tied in series with said tube, a source of alternating potential connected across said tube and serially connected primary winding, a condenser connected in shunt with said alternating voltage, an inductance connected in series with said alternating voltage and through which said condenser is charged, said alternating voltage having a frequency which corresponds to the resonant frequency of said inductance and said condenser, and means for keying said tube at the peak voltage point of said alternating voltage thereby rapidly discharging said condenser through said primary winding to produce a high voltage impulse across the secondary of said transformer.

7. A pulse modulator circuit comprising an alternating current power source, a charge storage device and impedance means connected in series across the power source to form a closed circuit, a grid control gas filled discharge tube having a cathode, an anode, and a grid, an output circuit, means connecting the anode-cathode path of said gas tube and the output circuit in series across the storage device, and phase shift means connecting the grid of said gas filled discharge device to the power circuit at a point therein operative to hold the grid negative relative to the cathode thereby to maintain the gas tube nonconductive while the storage device is charging and to initiate a discharge in said gas tube when the charge in said storage device is a maximum whereby a voltage pulse is formed in the output circuit.

8. A pulse modulator circuit comprising an alternating current power source, a charge storage device and an inductance connected in series across the power source to form a closed circuit substantially resonant at the frequency of the power source, a grid controlled gas filled discharge device having a cathode, an anode, and a grid, an output circuit, means connecting the anode-cathode path of said gas filled tube and the output circuit in series across the storage device, and phase shift means connecting the grid of said gas filled discharge device to the power circuit at a point operative to hold the grid negative relative to the cathode thereby to maintain said gas filled discharge device non-conductive while the storage means is charging and to initiate a discharge in said device when the charge in the storage device is a maximum, thereby producing a voltage pulse in the output circuit.

9. A pulse modulator circuit comprising, an alternating current power source, a power transformer having primary and secondary windings, means connecting the primary winding to the power source, a pulse transformer having primary and secondary windings, a charge storage device, an impedance means, a grid controlled gaseous discharge device having a cathode, an anode and a grid, means connecting the impedance means and the storage device in series across the secondary winding of the power transformer to form a closed circuit, means connecting the primary winding of the pulse transformer and the anode-cathode path of the gaseous discharge device in series across the storage device, and phase shift means connecting the grid of said gaseous discharge device to said power transformer at a point operative to hold said grid negative relative to the cathode to maintain the gas tube non-conductive while the storage means is charging and to initiate a discharge in said tube when the charge in said storage device is a maximum.

10. A pulse modulator substantially as set forth in claim 9 wherein said impedance means comprises an inductance and forms with said storage device, a closed circuit resonant at the frequency of the power source.

JOHN P. HAGEN.
ALDEN H. RYAN.

REFERENCES CITED

The following references are of record in the file of this patent:

UNITED STATES PATENTS

| Number | Name | Date |
|---|---|---|
| 2,120,565 | Lord et al. | June 4, 1938 |
| 2,319,215 | Dawson | May 18, 1943 |